United States Patent
Then-Gautier

(10) Patent No.: US 12,358,376 B2
(45) Date of Patent: *Jul. 15, 2025

(54) MODULE ACTIVE RESPONSE SYSTEM

(71) Applicant: Ecolution kWh, LLC, Naples, FL (US)

(72) Inventor: Johnny Then-Gautier, Santo Domingo (DO)

(73) Assignee: Ecolution kWh, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,809

(22) Filed: Feb. 26, 2024

(65) Prior Publication Data

US 2024/0198805 A1 Jun. 20, 2024

Related U.S. Application Data

(63) Continuation of application No. 17/320,910, filed on May 14, 2021, now Pat. No. 11,926,245, which is a
(Continued)

(51) Int. Cl.
*B60L 7/10* (2006.01)
*F16D 55/226* (2006.01)
*H02K 7/102* (2006.01)

(52) U.S. Cl.
CPC .............. *B60L 7/10* (2013.01); *F16D 55/226* (2013.01); *H02K 7/102* (2013.01); *B60L 2220/44* (2013.01)

(58) Field of Classification Search
None
See application file for complete search history.

(56) References Cited

U.S. PATENT DOCUMENTS 4,285,279 A 8/1981 Chiappetti
6,897,576 B2 5/2005 Ishikawa et al.
(Continued)

FOREIGN PATENT DOCUMENTS

CN 2923414 7/2007
CN 101951065 1/2011
(Continued)

OTHER PUBLICATIONS

Office Action issued Jul. 11, 2023 in counterpart application filed in Japan.
(Continued)

*Primary Examiner* — Todd Melton
*Assistant Examiner* — Jason R Roberson
(74) *Attorney, Agent, or Firm* — Patzik, Frank & Samotny Ltd

(57) ABSTRACT

A system and method for the supplemental generation of energy from operation of a vehicle, and specifically to the generation of energy from a vehicle's disc brakes in combination with generators. The system may include a generator, a rotational coupler such as a sprocket, a shaft connecting the rotational coupler to the generator, a rotational conveyor engaging the disc brake rotor and coupler to transmit rotational energy of a vehicle wheel to the rotational coupler and generator. In an alternate embodiment, the system may be used in connection with a disc brake caliper. A coupler bracket may be used to facilitate placement of the sprocket and rotational conveyor.

19 Claims, 19 Drawing Sheets

Related U.S. Application Data continuation-in-part of application No. 16/871,281, filed on May 11, 2020, now Pat. No. 11,485,235, which is a continuation of application No. 15/858,848, filed on Dec. 29, 2017, now Pat. No. 10,668,814.

(60) Provisional application No. 63/024,888, filed on May 14, 2020, provisional application No. 62/440,775, filed on Dec. 30, 2016.

(56) References Cited

U.S. PATENT DOCUMENTS

| | | |
|---|---|---|
| 9,415,660 B2 | 8/2016 | Koelsch |
| 10,668,814 B1 | 6/2020 | Then-Gautier |
| 11,485,235 B2 | 11/2022 | Then-Gautier |
| 2007/0261902 A1 | 11/2007 | Margoudakis |
| 2008/0067018 A1 | 3/2008 | Smith et al. |
| 2008/0078631 A1 | 4/2008 | Erlston |
| 2008/0128224 A1* | 6/2008 | Ruopp ............... F16D 65/0976 188/73.38 |
| 2010/0282122 A1 | 11/2010 | Mai |
| 2012/0091724 A1 | 4/2012 | Bodenstein |
| 2012/0194142 A1 | 8/2012 | Abe et al. |
| 2012/0326544 A1 | 12/2012 | Jou |
| 2013/0093189 A1 | 4/2013 | Lim |
| 2013/0147441 A1 | 6/2013 | Lee |
| 2013/0154363 A1 | 6/2013 | Lim |
| 2013/0167752 A1 | 7/2013 | Barbee |
| 2014/0188699 A1 | 7/2014 | Langgood et al. |
| 2015/0021978 A1 | 1/2015 | Feigel |
| 2016/0236658 A1 | 8/2016 | Rozza |
| 2017/0349039 A1 | 12/2017 | Rayner |
| 2018/0086355 A1 | 3/2018 | Pyper |
| 2018/0093655 A1 | 4/2018 | Hylion |
| 2019/0003534 A1* | 1/2019 | Estepa Rodriguez ... B60K 7/00 |
| 2019/0011000 A1 | 1/2019 | Welin |
| 2020/0144893 A1 | 5/2020 | Saavedra |

FOREIGN PATENT DOCUMENTS

| | | |
|---|---|---|
| CN | 202463594 U | 10/2012 |
| CN | 204383196 U | 6/2015 |
| CN | 106585404 | 4/2017 |
| CN | 107683228 A | 2/2018 |
| CN | 208277869 | 12/2018 |
| FR | 2985953 | 7/2013 |
| JP | H05-184014 | 7/1993 |
| JP | H8-152836 | 6/1996 |
| JP | H10-76921 | 3/1998 |
| JP | 2007-030750 | 2/2007 |
| JP | 2012-62877 | 9/2010 |
| JP | 2015-39291 | 2/2015 |
| JP | 2017-89746 | 5/2017 |
| JP | 2017-170971 | 9/2017 |
| KR | 20140049715 A | 4/2014 |
| KR | 20160081005 A | 7/2016 |
| KR | 20160092529 A | 8/2016 |
| KR | 10-2030281 B1 | 10/2019 |
| WO | 2020/069737 A1 | 4/2020 |

OTHER PUBLICATIONS

Office Action issued Sep. 27, 2023 in Japanese Patent Application No. 2022-568947.
Written Opinion and Search Report dated Jan. 13, 2021 for counterpart PCT Application No. PCT/US20/49251.
Written Opinion and Search Report dated Feb. 13, 2024 for counterpart PCT Application No. PCT/US23/82315.
Machine translation of KR 20160081005 patent publication published Jul. 8, 2016.

* cited by examiner

MODULE ACTIVE RESPONSE SYSTEM

CROSS-REFERENCE TO RELATED APPLICATIONS

This present application is a continuation of U.S. patent application Ser. No. 17/320,910, filed May 14, 2021, which issued as U.S. Pat. No. 11,926,245, on Mar. 12, 2024, which claims benefit to U.S. Provisional Patent Application No. 63/024,888, filed May 14, 2020, and is a continuation-in-part of U.S. Non-Provisional patent application Ser. No. 16/871,281, filed May 11, 2020, which issued as U.S. Pat. No. 11,485,235 on Nov. 1, 2022, which is a continuation of U.S. Non-Provisional patent application Ser. No. 15/858,848, filed Dec. 29, 2017, which issued as U.S. Pat. No. 10,668,814 on Jun. 2, 2020, and which claims benefit to U.S. Provisional Patent Application No. 62/440,775, filed Dec. 30, 2016, all of which are expressly incorporated by reference herein in their entirety.

PATENTS CITED

The following documents and references are incorporated by reference in their entirety, Erlston et al (U.S. Pat. Appl. No. 2008/0078631) and Bodenstein et al (U.S. Pat. Appl. No. 2012/0091724).

FIELD OF THE INVENTION

The present invention relates to the supplemental generation of energy from a vehicle operation, and specifically to the generation of energy from vehicle disc brakes in combination with brushless electric motor-generators.

DESCRIPTION OF THE RELATED ART

A vehicle's motion requires a large amount of energy to be accomplished, and an almost equal amount of energy (minus transmission losses) is released when the vehicle is stopped. In recent times, hybrid and other vehicles have used the electric motors located at the wheels to regenerate energy when braking is applied. In the same way, some of the energy spent to make the vehicle move can be recuperated.

Vehicles equipped with disc brakes (e.g., automotive, rail vehicle, light aircraft and other similar applications) employ a rotor located on the axle or wheel hub and a caliper mechanism that clamps brake pads against both sides of the rotor, creating friction and generating braking force. In most commercial and military aircraft, multiple rotors are connected, with ventilating slots between them. In conventional disc brake usage, a vehicle's kinetic energy is dissipated as heat when the brakes are applied.

The ability to generate electricity from such braking motion would be advantageous in that a battery would be charged, therefore obviating the need for the vehicle alternator to operate. What is required is a simple mechanical way in which to couple to said brake rotors.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a vehicle energy generation system for use with a disc brake rotor having a channel extending about its circumference the system comprising a generator, a rotational coupler such as a sprocket, a shaft connecting the rotational coupler to the generator, a chain or other rotational conveyor positioned within the channel and engaging part of the disc brake rotor and coupler to translate rotational energy of the wheel to the sprocket and shaft and therefor the generator to generate energy, and electronic components for connecting said generator to an energy storage system such as the vehicle's electrical system or batteries.

Other features and advantages of the present invention will become apparent upon examining the following detailed description of an embodiment thereof, taken in conjunction with the attached drawings.

Figure 1:
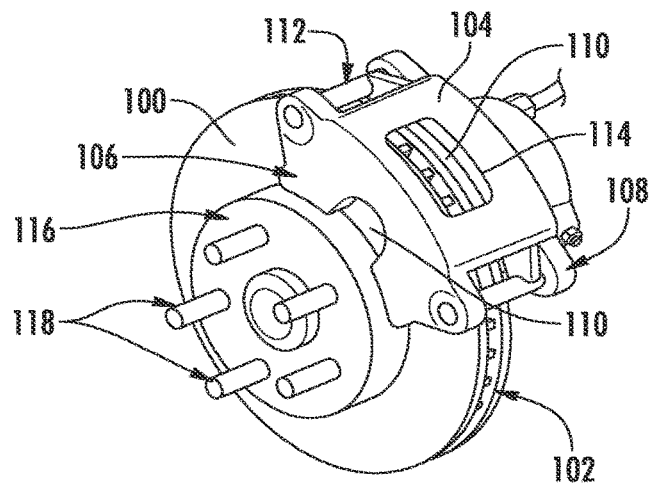
FIG. 1 is a front perspective view showing the components of a disc brake system, according to the prior art.
Figure 2:
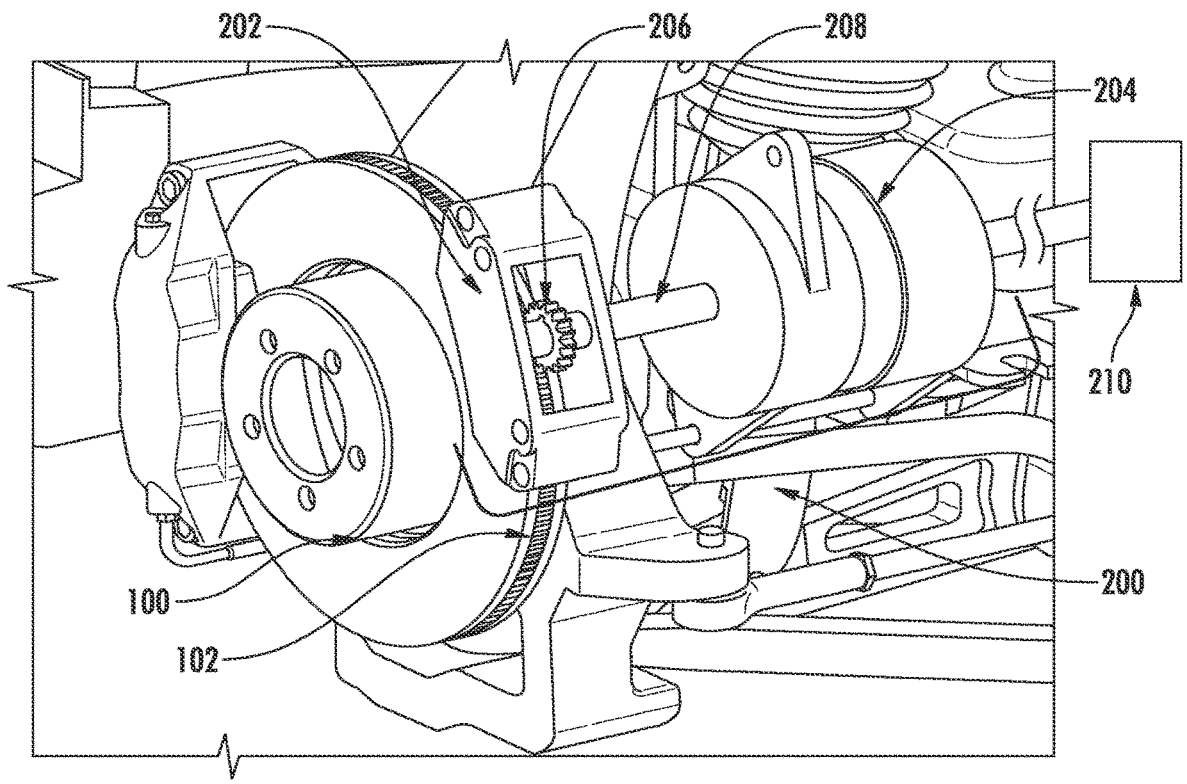
FIG. 2 is a perspective view of a coupled disc brake and generator, according to one embodiment of the invention.
Figure 3:
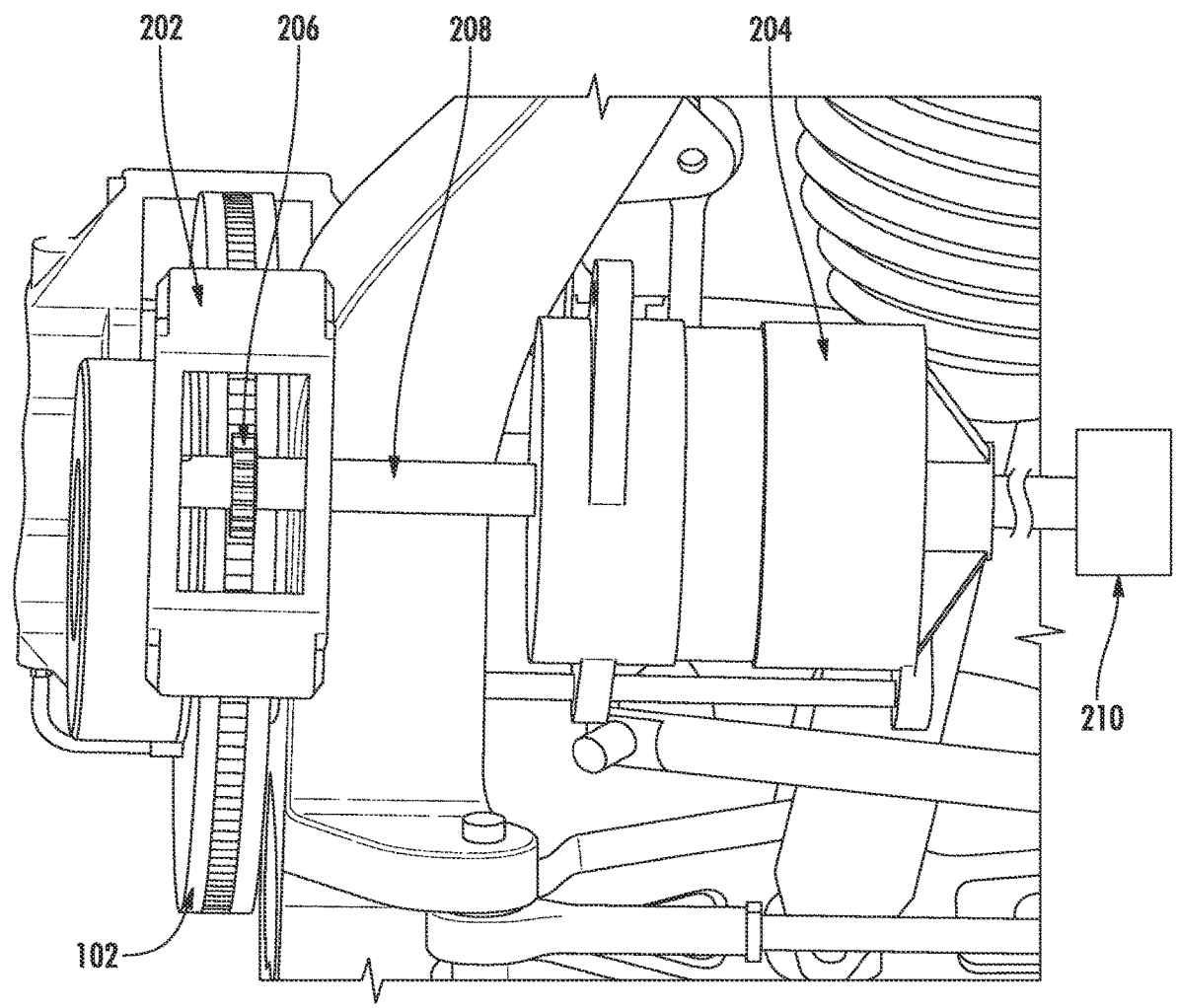
FIG. 3 is a rear view of a coupled disc brake and generator, according to one embodiment of the invention.
Figure 4:
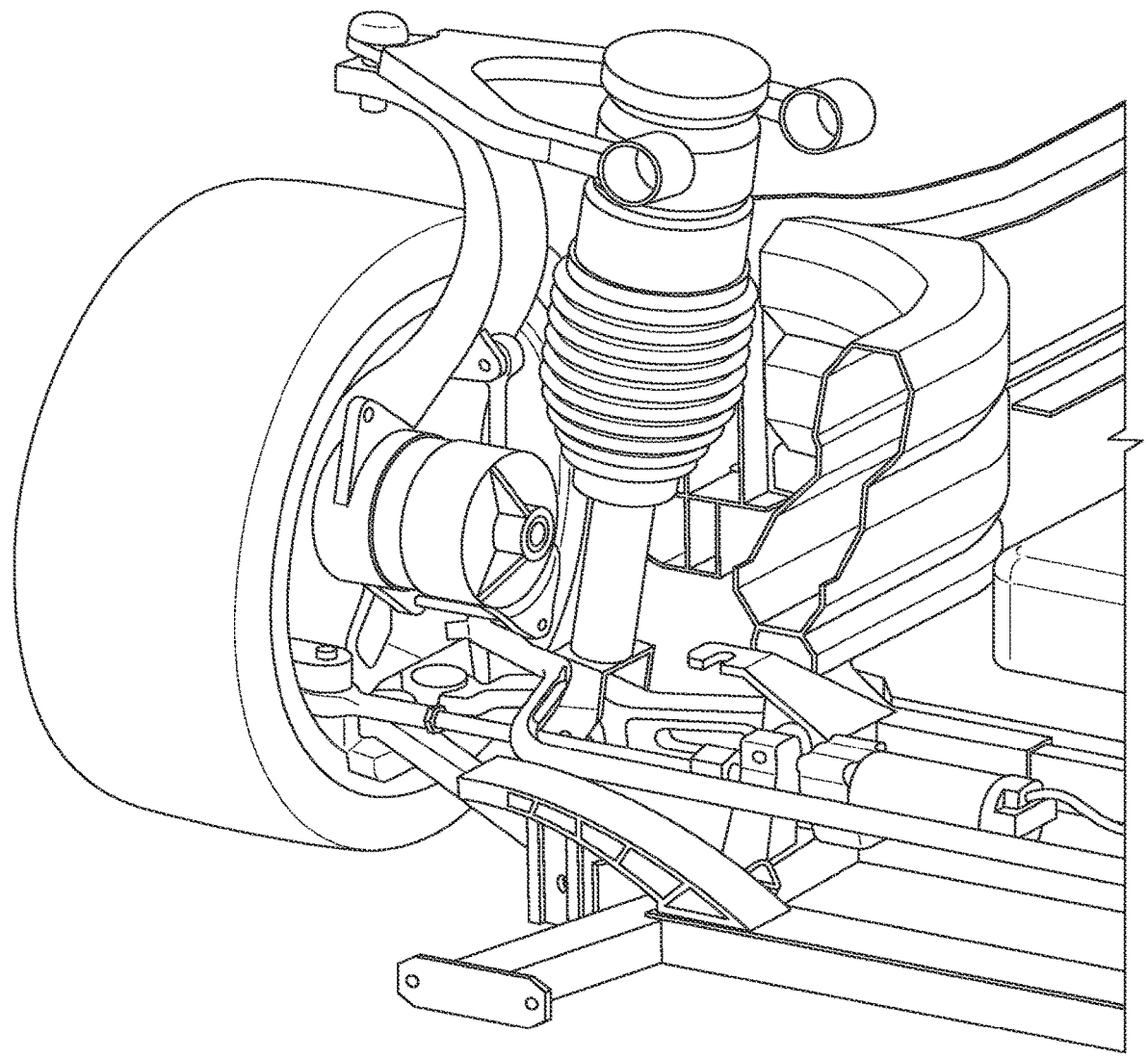
FIG. 4 is a perspective view of a coupled disc brake and generator including a vehicle tire, according to one embodiment of the invention.
Figure 5:
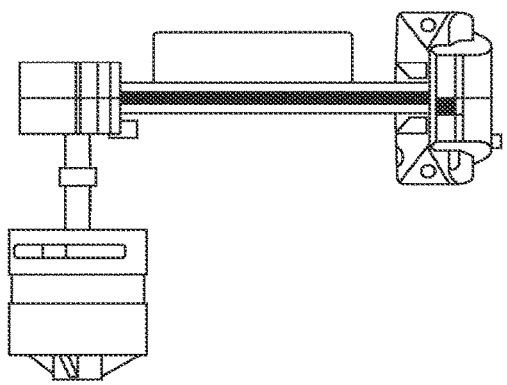
FIGS. 5 and 6 are top views of the coupled disc brake and generator, according to one embodiment of the invention.
Figure 6:
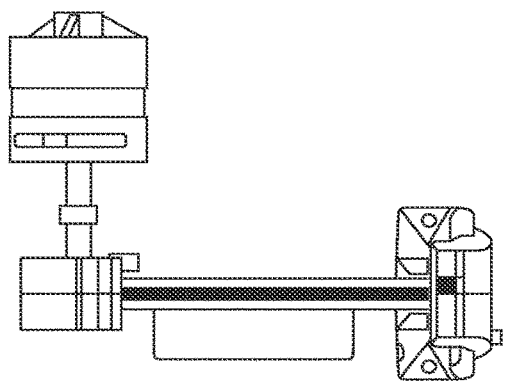
Figure 7:
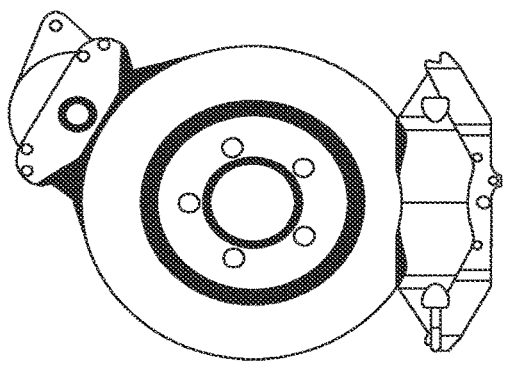
FIGS. 7 and 8 are side views of the disc brake and bracket, according to one embodiment of the invention.
Figure 8:
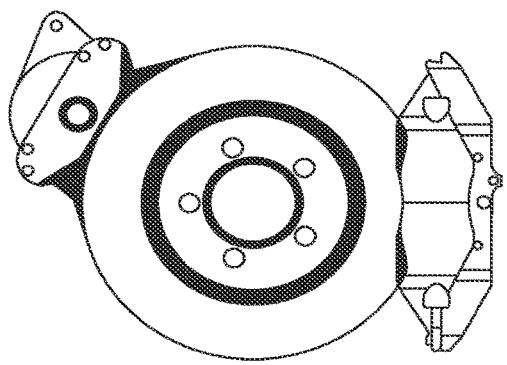
Figure 9:
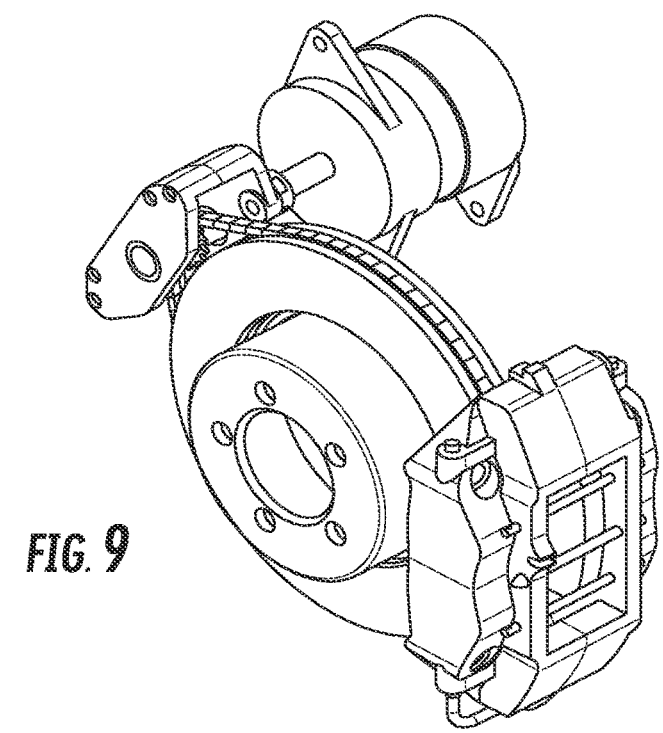
FIGS. 9 and 10 are perspective views of the disc brake and generator components, according to one embodiment of the invention.
Figure 10:
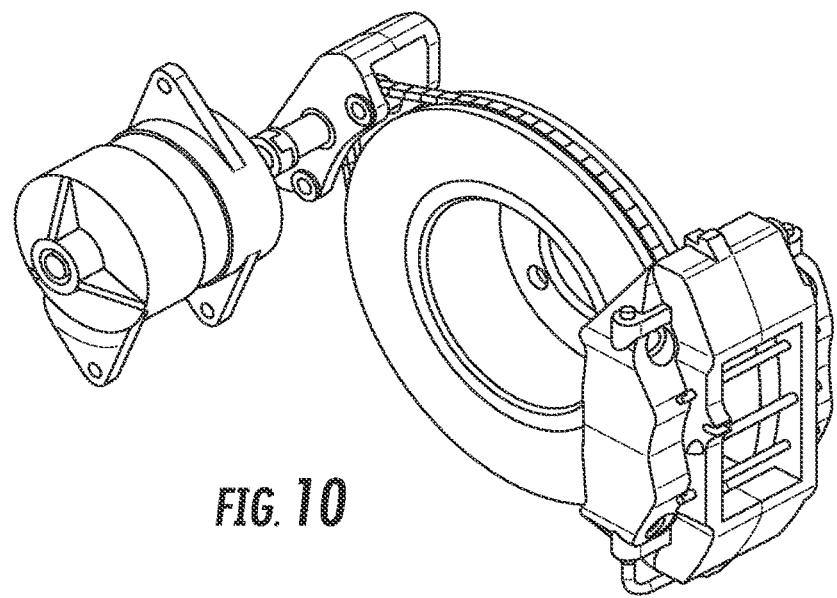
Figure 12:
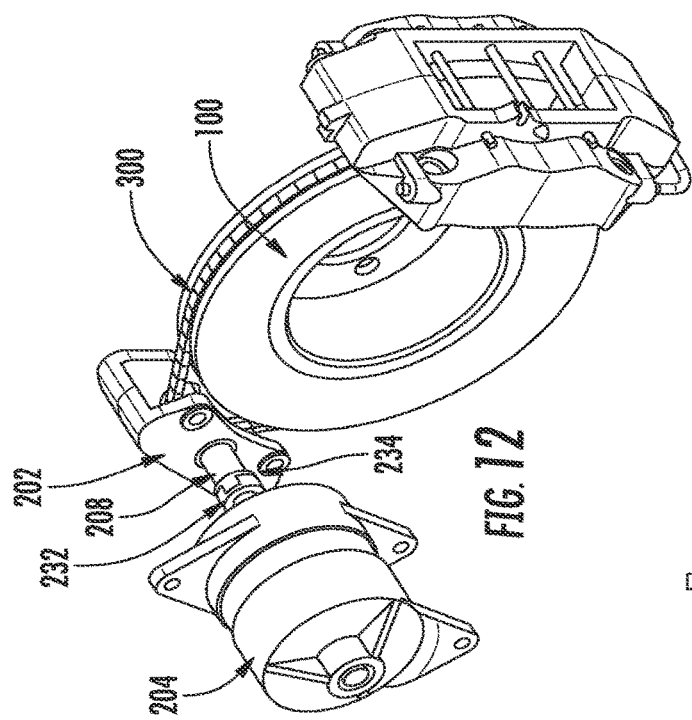
FIG. 12 is a perspective view of a chained and coupled disc brake and generator, according to one embodiment of the invention.
Figure 13:
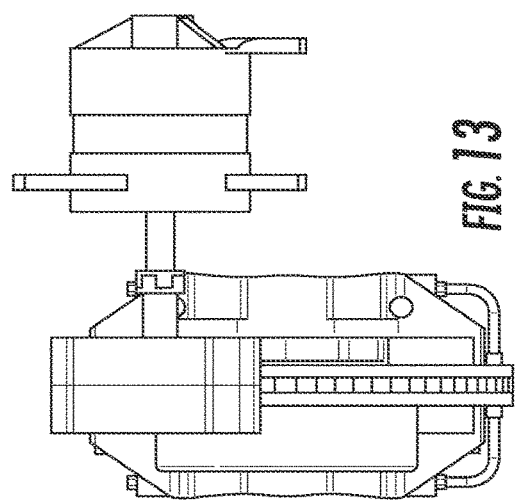
FIG. 13 is a front view of a chained and coupled disc brake and generator, according to one embodiment of the invention.
Figure 11:
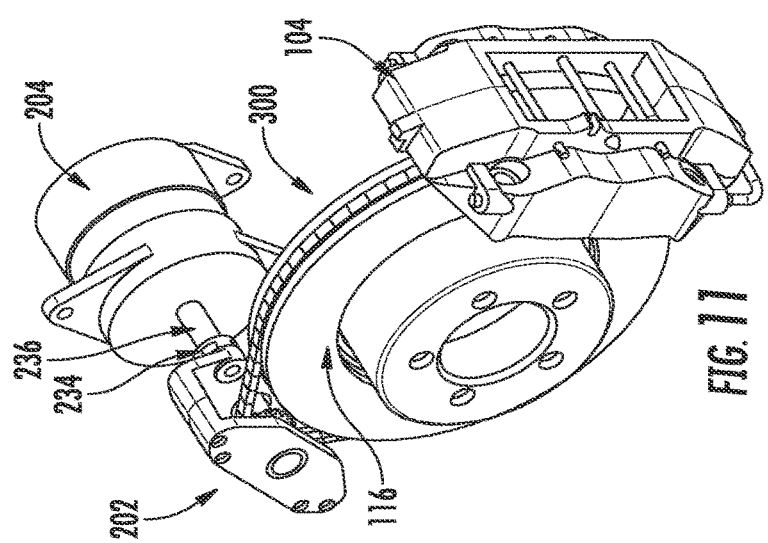
FIG. 11 is a perspective view of a chained and coupled disc brake and generator including the wheel hub, according to one embodiment of the invention.

The above-described and other features will be appreciated and understood by those skilled in the art from the following detailed description, drawings, and appended claims.

DETAILED DESCRIPTION OF INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1, a disc brake system as presently embodied in the prior art is shown with a disc or disk brake rotor 100 that has ventilating slots 102 circumferentially positioned about the center of the disc or disk brake rotor 100. A brake caliper 104 having a hollow interior defined by a pair of side portions 106, 108 is positioned astride of the disc brake rotor 100. Positioned within the hollow interior on the inside of the side portions 106, 108 are a pair of brake pads 110 sized to engage a portion of the outer surfaces of the disc brake rotor 100. A guide pin 112 located at one end of the brake caliper 104 allows the brake caliper 104 to be squeezed, thereby moving the brake pads 110 into engagement with the disc brake rotor 100. An inspection hole 114 on the top of the brake caliper 104 allows for the brake pads 110 to be viewed to determine their relative wear. The disc brake rotor 110 is connected to the wheels through the wheel hub 116 and wheel studs 118. While a disc brake rotor is shown and disclosed, it is appreciated that the energy generation system of the present invention may be used with other components that rotate with the tires including, but not limited to, drum brakes.

Referring to FIGS. 2-37, various embodiments of the energy generation system 200 are shown as having a generator 204, a mechanical coupler 206, a connecting member 208 and an energy storage system 210. In both front and rear wheel configurations the system 200 fits within the wheel area, with those in front being able to rotate with wheel movement.

Figure 19:
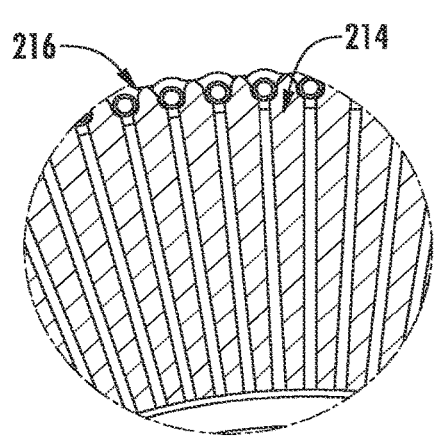
FIG. 19 is a partial sectional view of a disc brake coupled with a chain, according to one embodiment of the invention.

Referring to FIGS. 2-3, 21 and 29A-C, the mechanical coupler 206 is shown as a sprocket or gear having a plurality of teeth 212 spaced apart its circumference and sized and shaped to engage the corresponding ventilating slots 102 on the disc brake rotor 100. In an alternate embodiment (FIGS. 33-37), the coupler 206 engages openings in a roller chain 300 that is placed around the edge of the disc brake rotor 100, facilitating the rotation. Referring to FIG. 19, in order to facilitate the mechanical connection of the chain 300 to the disc brake rotor 100, the spokes or elongated members 214 forming the ventilating slots 102 have tapered ends 216 for engaging openings in the chain 300. While a chain is shown and disclosed, it is appreciated that other rotation conveyors such as, but not limited to, timing belts and pulleys may be used.

The mechanical coupler 206 is connected to a shaft or axle 208 through its center. In order to maintain the coupler 206 in position relative to the disc brake rotor 100, a bracket 202 may be used. Similar to the disc caliper 104 in operation, the bracket 202 remains parallel to the disc brake surface. In order to not interfere with the operation of the disc brake, the coupler 206 and bracket 202 are placed apart from the caliper 104 about the disc brake rotor 102.

Figure 16:
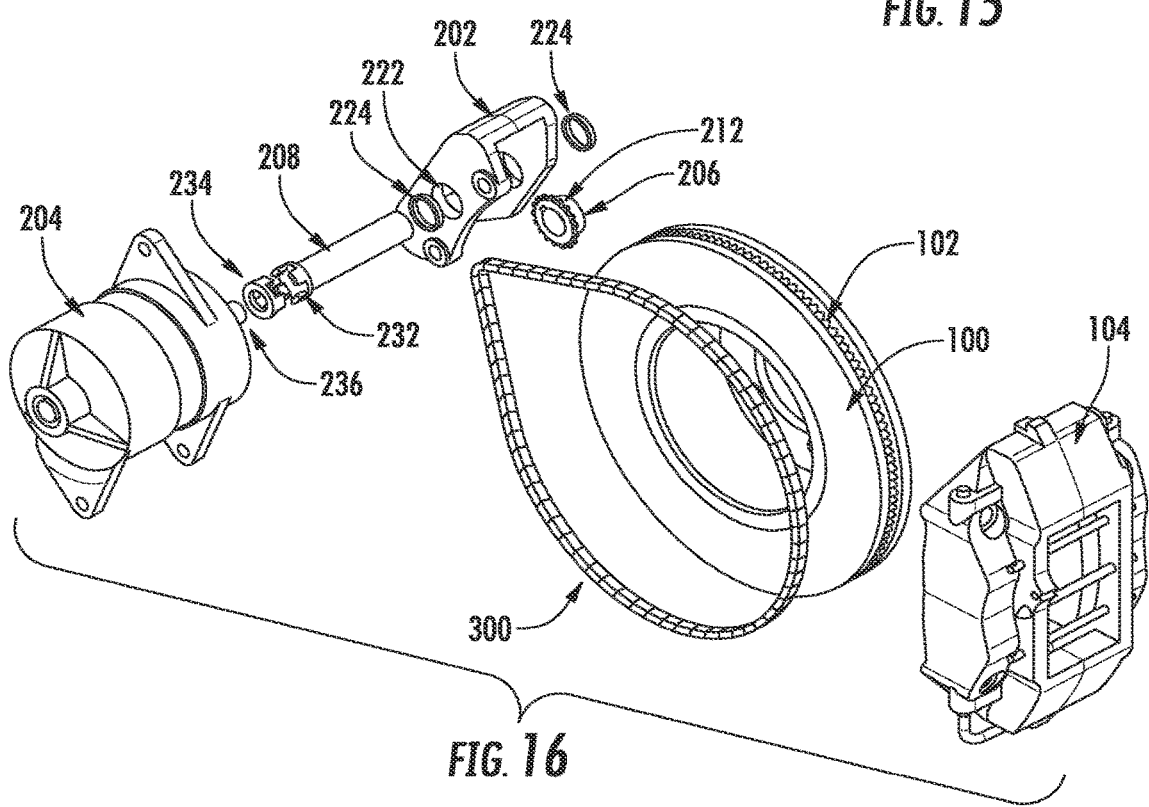
FIG. 16 is a partially exploded perspective view of a chained and coupled disc brake and generator, according to one embodiment of the invention.
Figure 17:
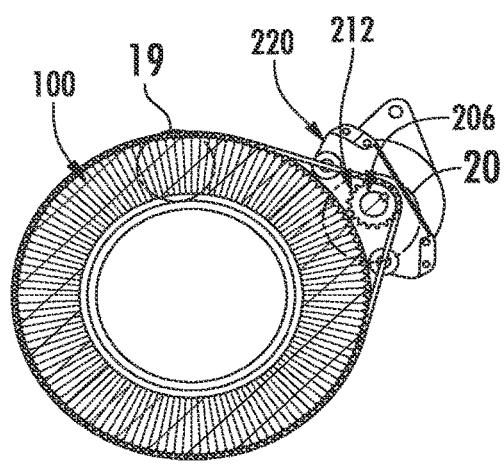
FIG. 17 is a sectional side view taken along the line B-B of FIG. 18 of a chained and coupled disc brake and generator, according to one embodiment of the invention.
Figure 18:
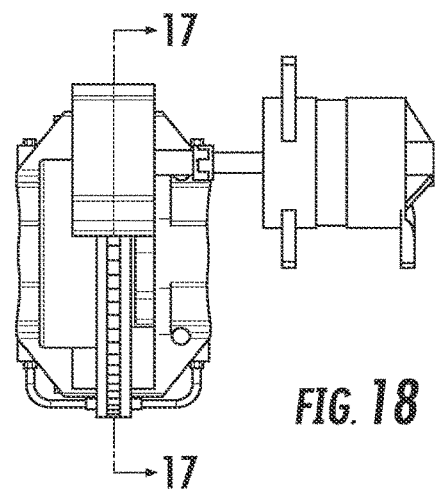
FIG. 18 is a front view of a chained and coupled disc brake and generator, according to one embodiment of the invention.

Referring again to FIG. 2, the bracket 202, having a hollow interior defined by pair of side walls 220, is positioned astride of the disc brake rotor 100. Opposing holes 222 extend through the side walls 220 for receiving a portion of the axle or shaft 208 therethrough to allow the coupler 206 to be aligned with the ventilating slots 102. As shown in FIG. 16, bushings 224 may be inserted into the holes 222 to facilitate rotation of the axle 208.

The axle 208 is connected to the generator 204 for generating energy in the form of either alternating current ("AC") or direct current ("DC"). The energy is then transmitted and/or stored in an energy storage component or system that may be locally positioned with the generator or is part of the vehicle's energy system. This may include feeding into the alternator/battery bus, and/or into a separate vehicle electronics circuitry. For example, the energy may be stored in one or more batteries positioned in the vehicle and/or any trailers or attachments thereto.

Referring now to FIGS. 13, 23-24, 27-28, 31-33 and 37, the energy generation system 200 may be equipped with a clutch 230 to only generate energy when desired or needed. The positive clutch 230 shown in the figures includes a jaw member 232 on the end of the axle 208 and a corresponding jaw member 234 positioned on a driven shaft 236 for the generator 204. When the clutch 230 is engaged, the corresponding jaw members 232, 234 are engaged to allow for the transmission of the rotational movement to the generator 204. When disengaged, the axle 208 will rotate without transmitting energy to the generator 204. Similarly, the generation of energy may be electronically shunted, so the load is minimal when not generating energy.

In operation, one or more teeth 212 from the sprocket 206 engage respective slots in the ventilating slots 102 of the disc brake rotor 100. As the disc brake rotor 100 is rotated, the sprocket 206 and axle 208 will also rotate as the teeth 212 of the sprocket 206 are moved out of and into engagement with the slots 102. Thus, as the wheel moves, the disc brake rotor 100 moves, and the axle 208 going to the generator moves thereby creating energy to be stored in the vehicle. If desired, the clutch 230 may be utilized to selectively permit control of the transmission of the energy to the generator 204.

Figure 14:
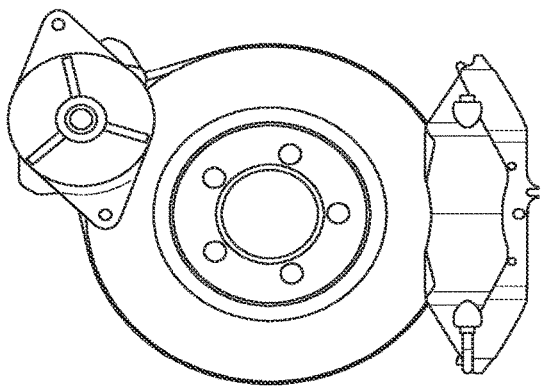
FIG. 14 is a side view of a chained and coupled disc brake and generator, according to one embodiment of the invention.
Figure 15:
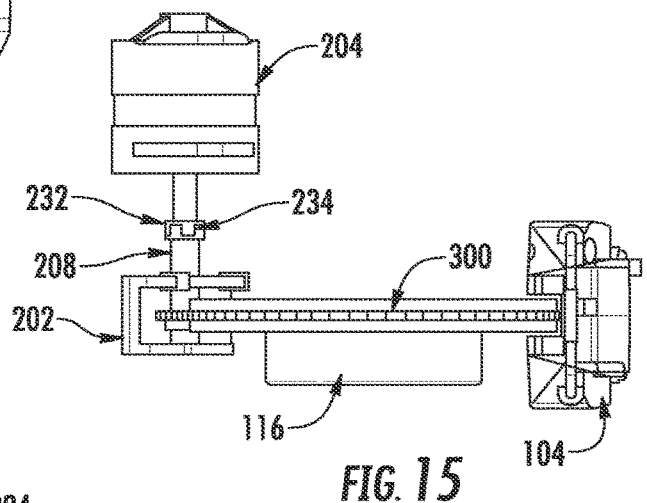
FIG. 15 is a top view of a chained and coupled disc brake and generator, according to one embodiment of the invention.
Figure 20:
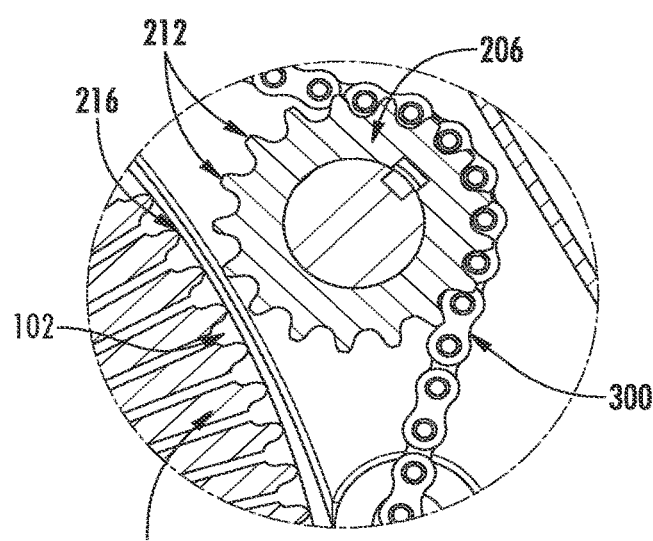
FIG. 20 is a partial sectional view of the sprocket coupled with the chain, according to one embodiment of the invention.
Figure 21:
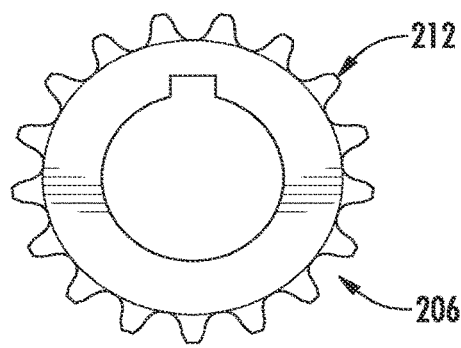
FIG. 21 is a top view of the sprocket, according to one embodiment of the invention.
Figure 22:
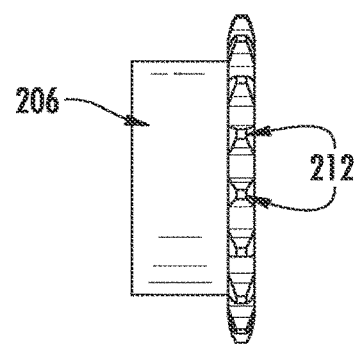
FIG. 22 is a side view of the sprocket, according to one embodiment of the invention.
Figure 23:
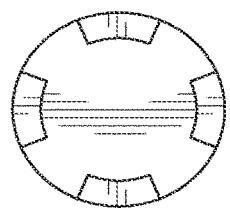
FIG. 23 is a top plan view of the axle and jaw member of the clutch.
Figure 24:
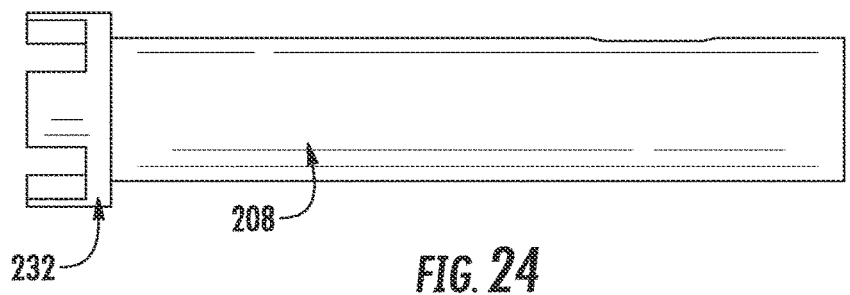
FIG. 24 is a side view of the axle and jaw member of the clutch.
Figure 25:
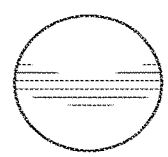
FIG. 25 is a top plan view of the generator shaft or driven member of the clutch.
Figure 26:
FIG. 26 is a side view of the generator shaft or driven member of the clutch.
Figure 27:
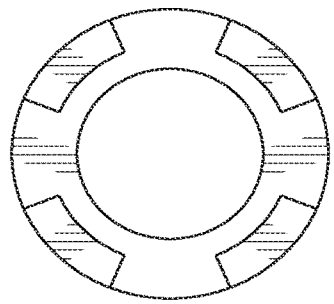
FIG. 27 is a top plan view of the jaw member of the clutch.
Figure 28:
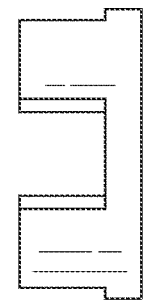
FIG. 28 is a side view of the jaw member of the clutch.
Figure 29A:
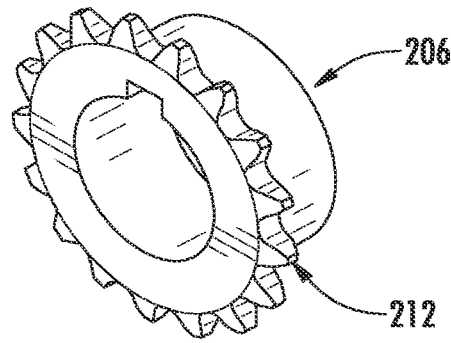
FIGS. 29A-29C show various views of the sprocket, according to one embodiment of the invention.
Figure 29B:
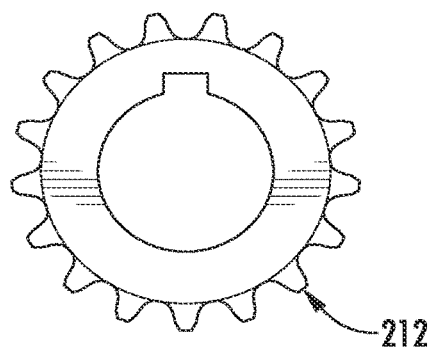
Figure 29C:
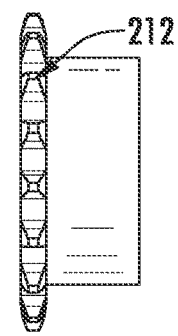
Figure 30A:
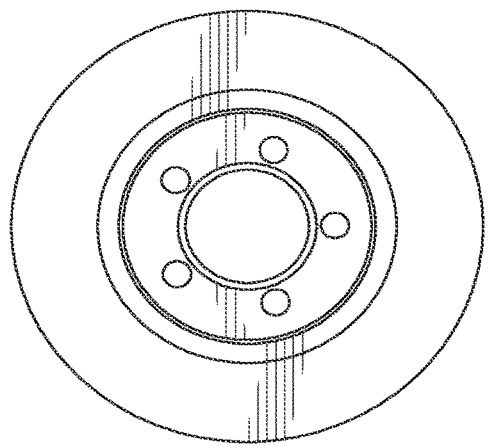
FIGS. 30A-30E show various views of the disk assembly components, according to one embodiment of the invention.
Figure 30B:
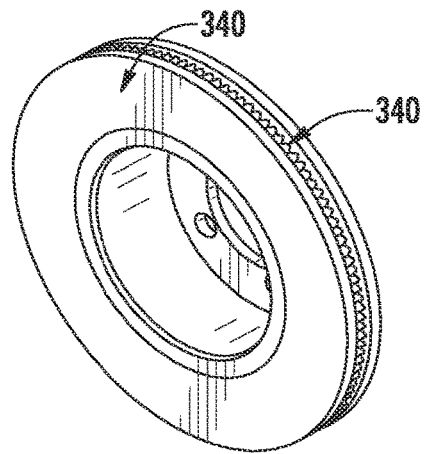
Figure 30C:
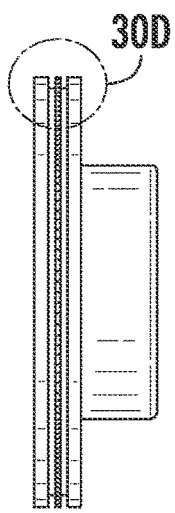
Figure 30D:
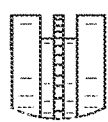
Figure 30E:
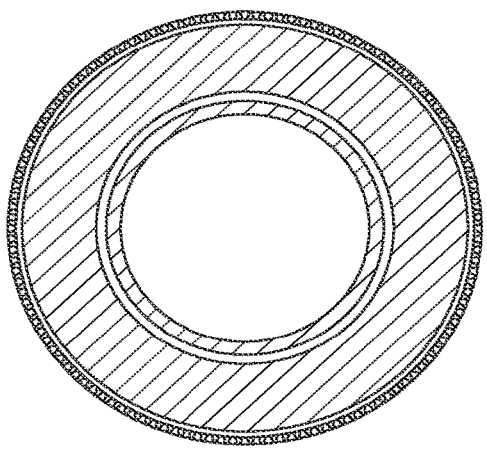
Figure 31:
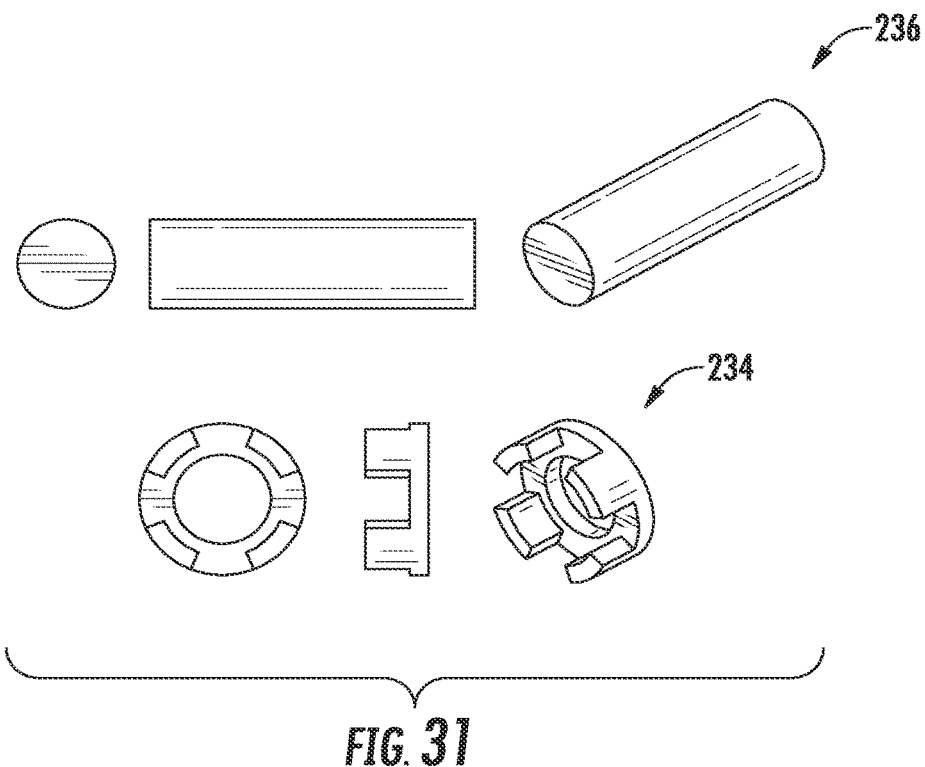
FIGS. 31-32 show various views of the axle and clutch, according to one embodiment of the invention.
Figure 32:
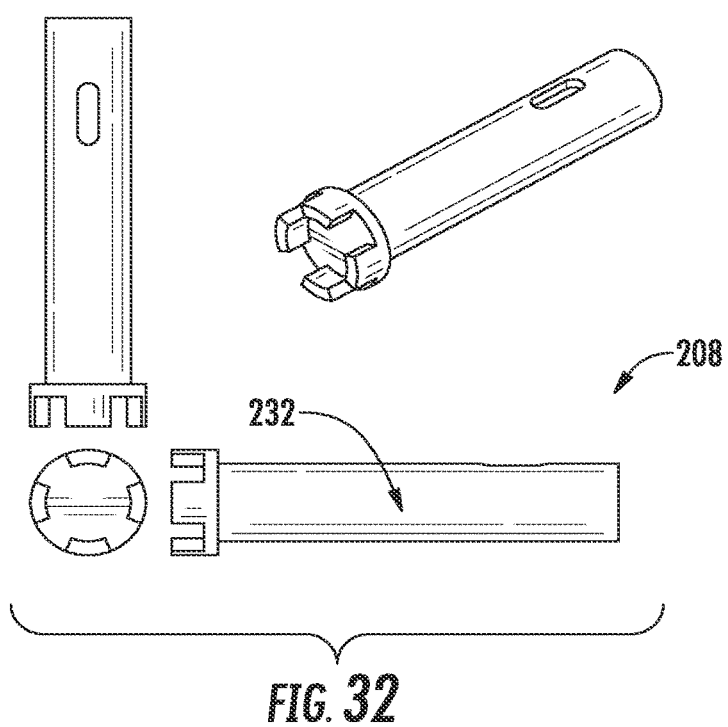
Figure 33:
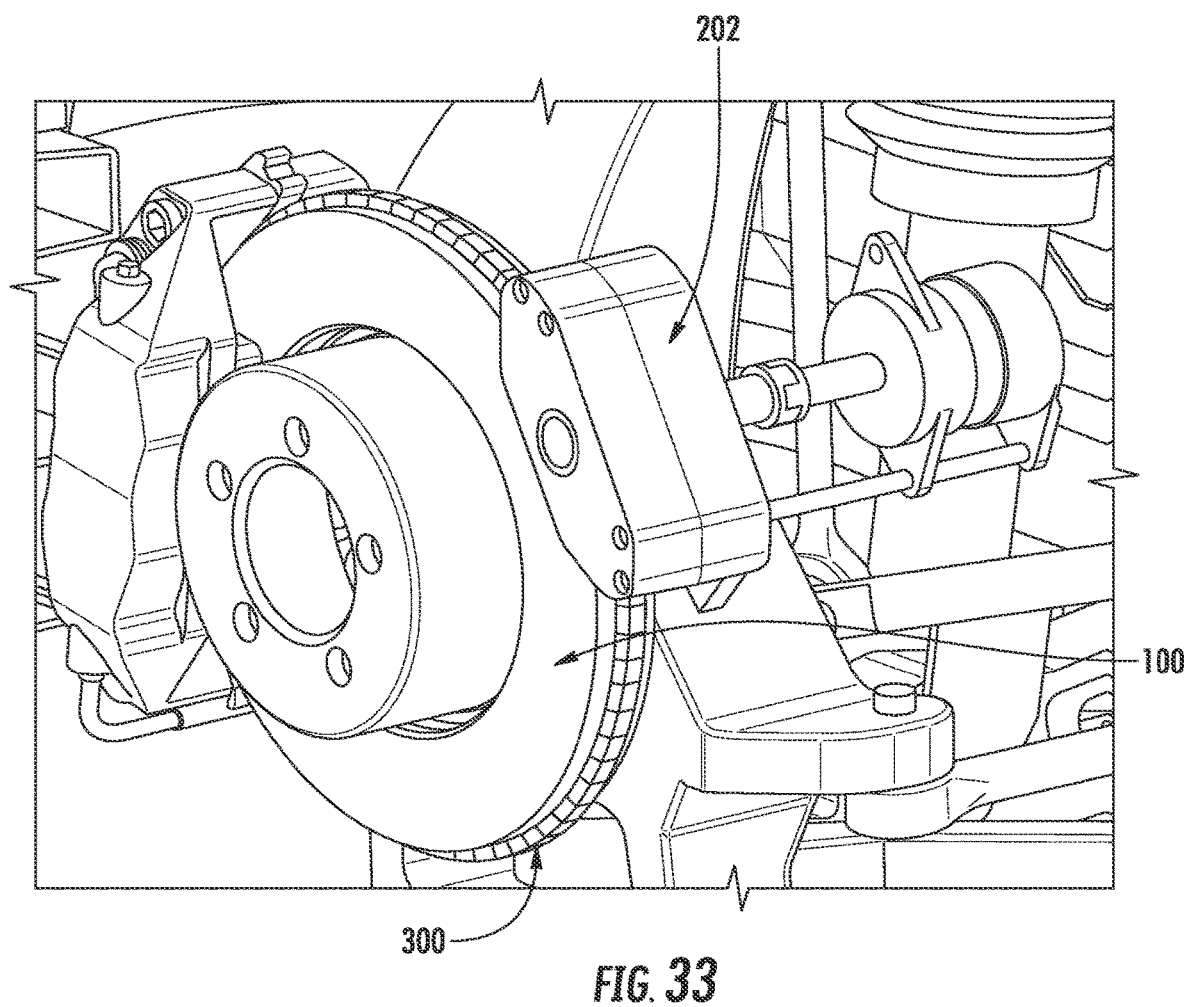
FIG. 33 is a perspective view of a coupled disc brake and generator, according to another embodiment of the invention.
Figure 34:
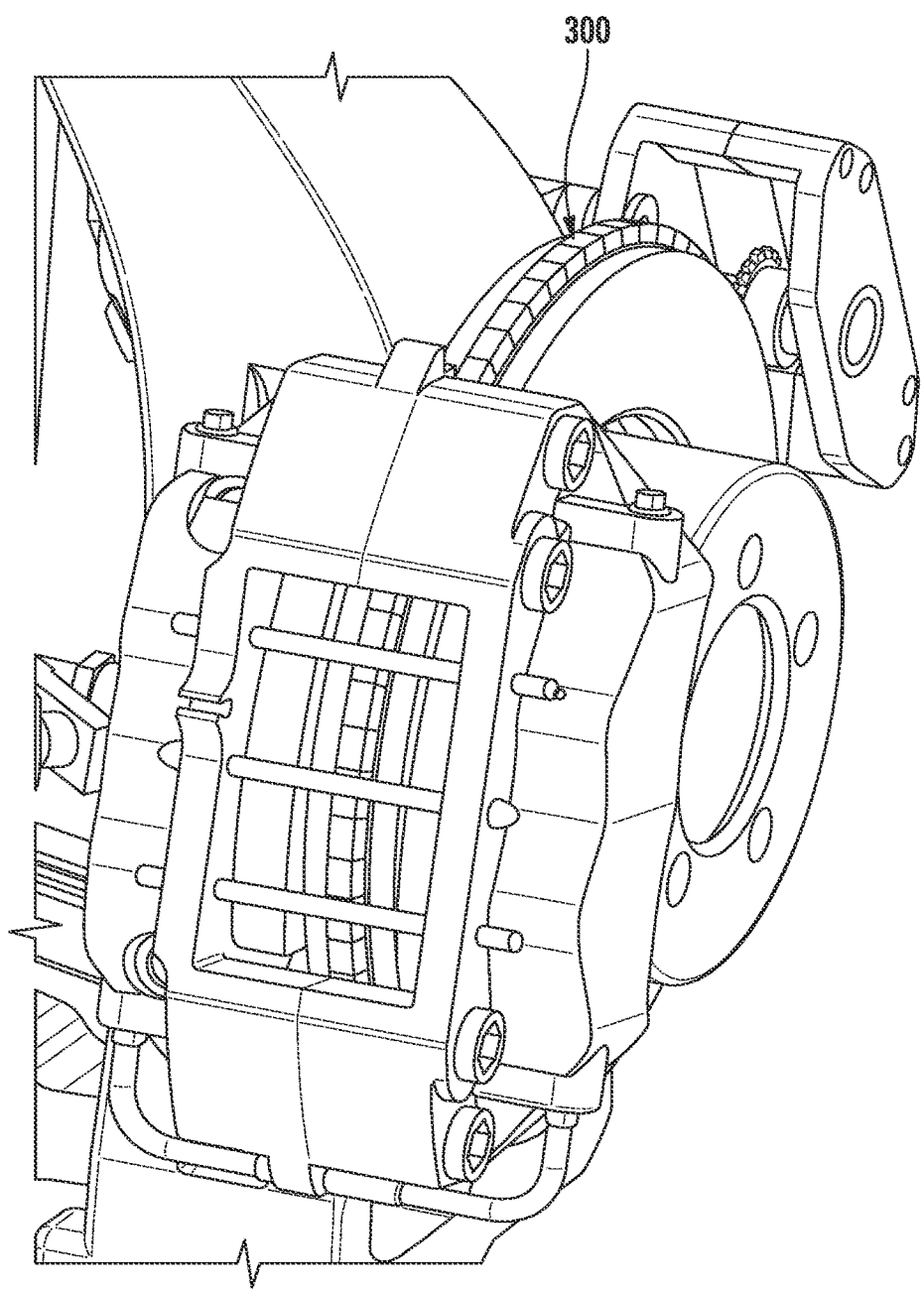
FIG. 34 is a front perspective view of a coupled disc brake and generator, according to another embodiment of the invention.
Figure 35:
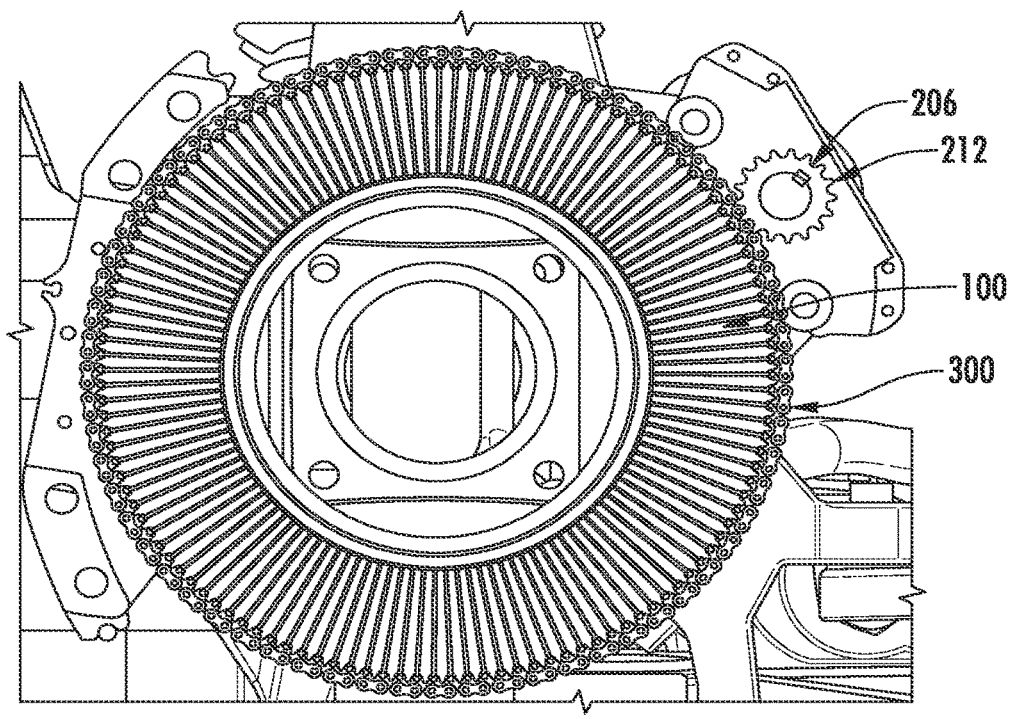
FIG. 35 is a cross-sectional side view of a coupled disc brake and generator, according to another embodiment of the invention.
Figure 36:
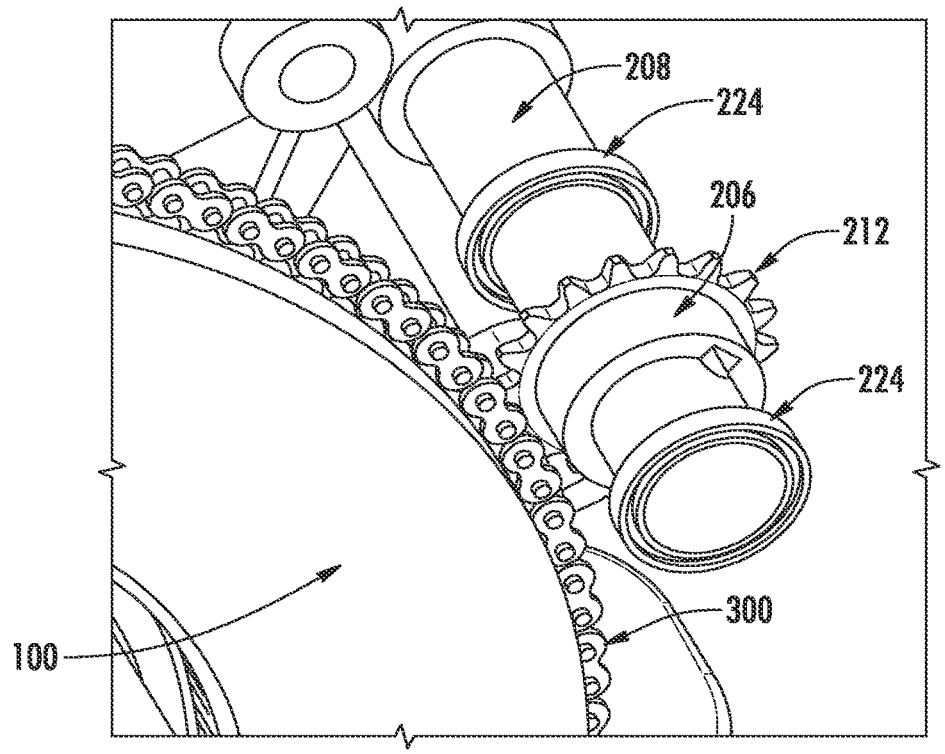
FIG. 36 is a partial perspective view of a coupler engaging a chain around the disc brake rotor, according to one embodiment of the invention.
Figure 37:
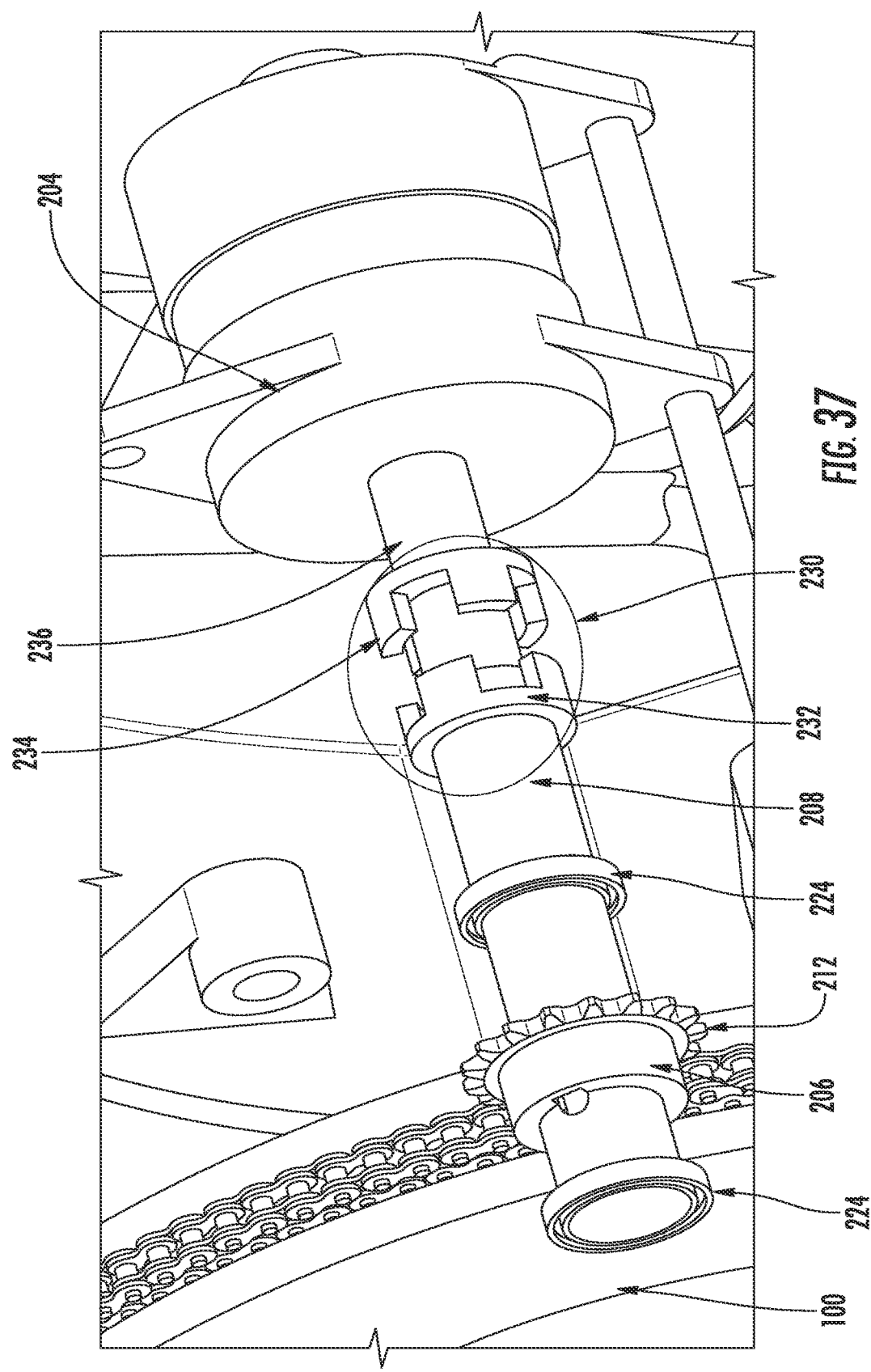
FIG. 37 is a partial perspective view of a coupler engaging a chain around the disc brake rotor and showing a clutch, according to one embodiment of the invention.
Figure 38:
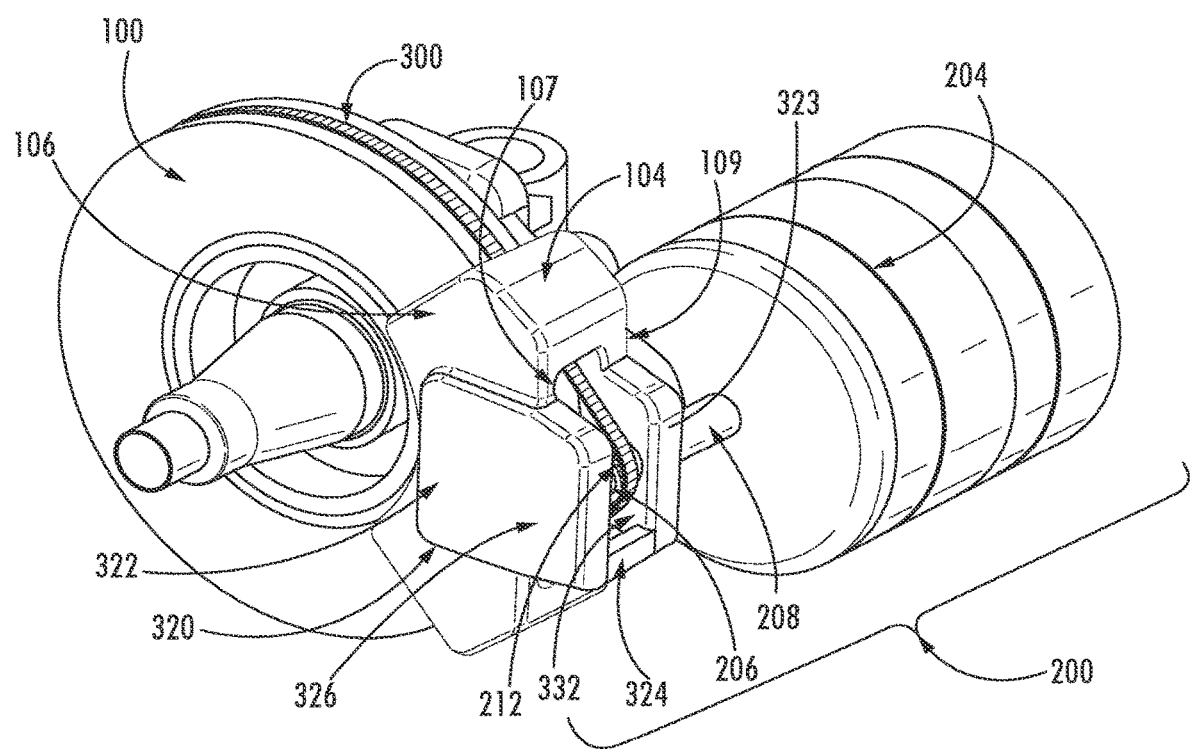
FIG. 38 is a perspective view of a combined brake/generator/drive assembly, according to one embodiment of the invention.

FIGS. 11 to 20 show another embodiment of the present invention utilizing a chain 300 to transmit rotational energy from the disc brake rotor 100 to the coupler or sprocket 206. In this embodiment, the sprocket 206 is offset from the disc brake rotor 100. Referring to FIGS. 19-20, the ventilating slots 102 are formed by a plurality of spokes or elongated members 214 having tapered ends 216. The chain 300 extends around both a substantial portion of the circumference of the disc brake rotor 100, engaging the tapered ends 216 thereon, and a portion of the sprocket 206, thereby engaging the teeth 212 on the sprocket. Referring to FIG. 14, a clutch 230, as disclosed above, may be used to selectively control transmission of the energy to the generator 204.

Referring to FIGS. 38-42, another embodiment of the energy generation system 200 of the present invention is shown as being used in connection with a disc brake caliper 104. Similar to the embodiments shown in FIGS. 2-37 and disclosed above, the energy generation system 200 is shown as having an energy transformation component or generator 204, a mechanical coupler 206 and a connecting member 208. Additionally, the energy generation system 200 may be electrically connected to an energy storage system 210.

Figure 39:
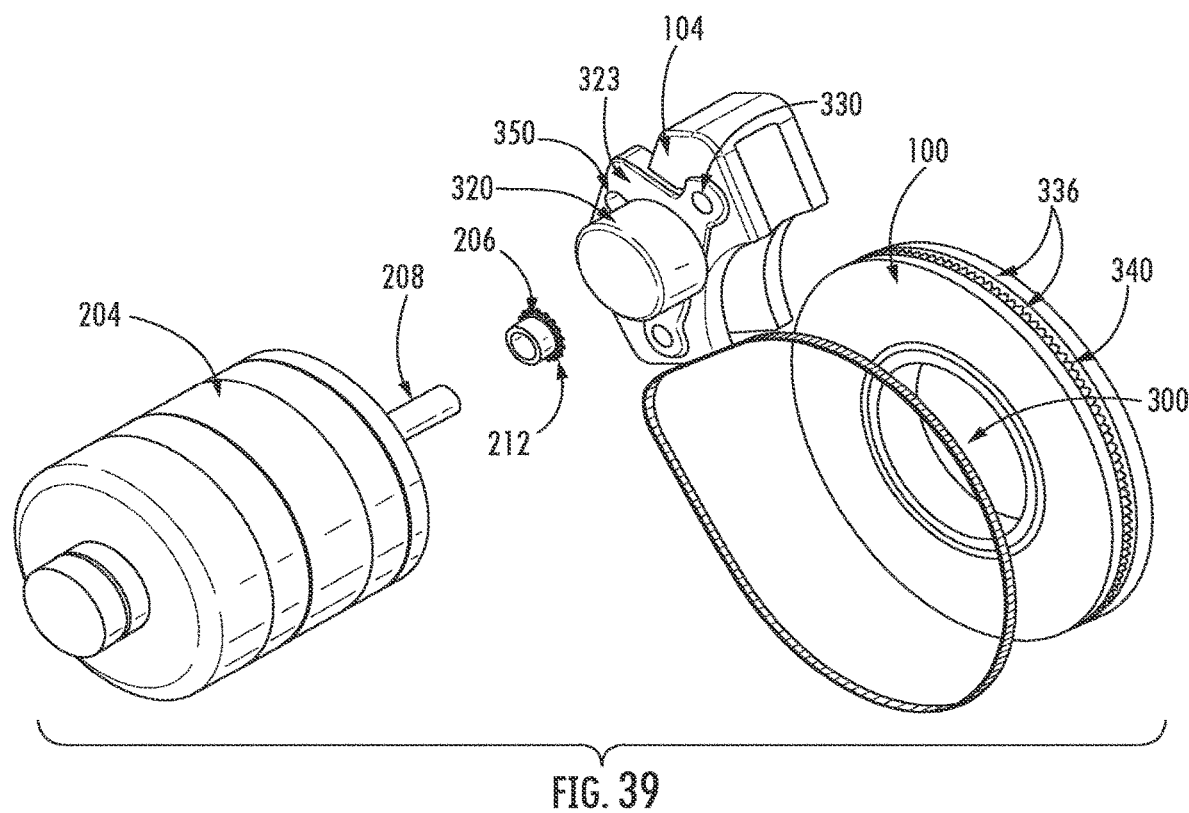
FIG. 39 is a partially exploded perspective view of the brake/generator/drive assembly of FIG. 38.
Figure 40:
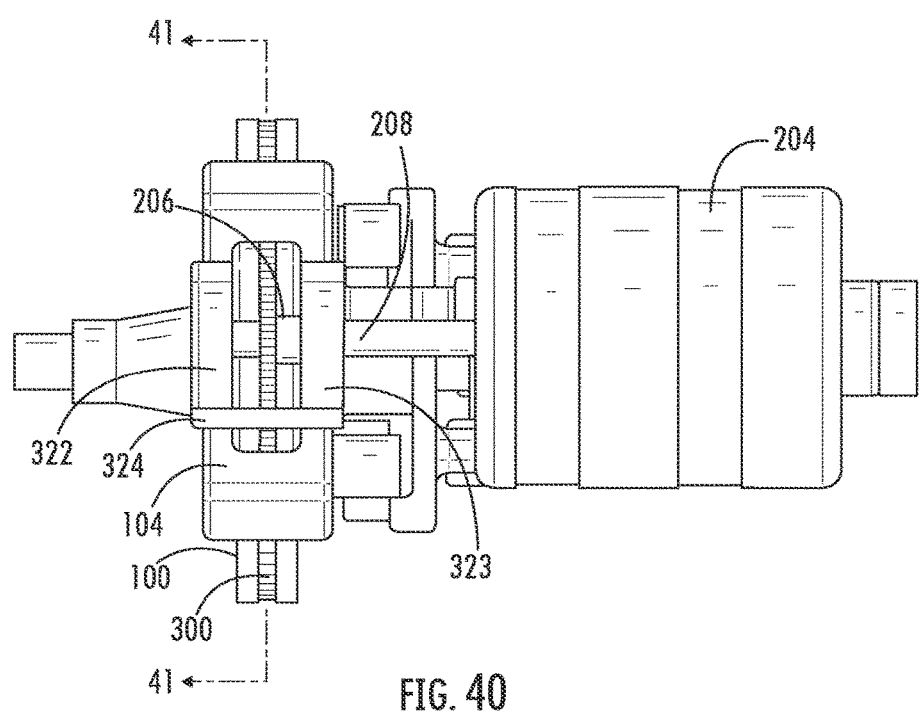
FIG. 40 is a side view of the combined brake/generator/drive assembly of FIG. 38.
Figure 41:
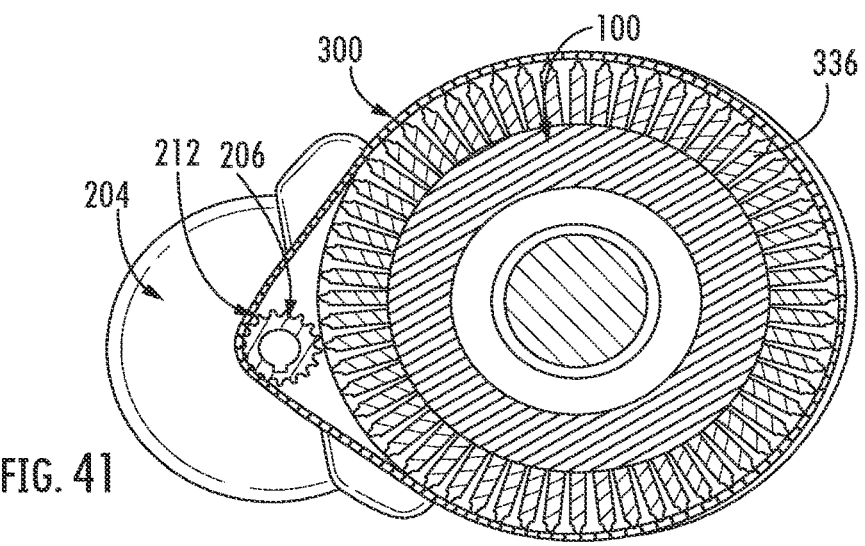
FIG. 41 is a cross-sectional view of the brake/generator/drive assembly of FIG. 40.
Figure 42:
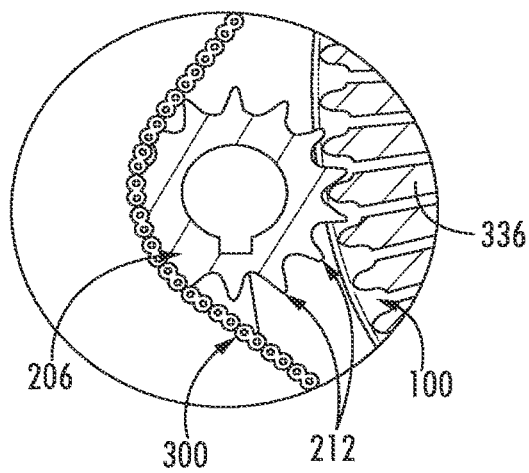
FIG. 42 is an enlarged view of the sprocket component assembly of FIG. 41.

In order to work with an existing brake caliper 104, the mechanical coupler, shown as a sprocket or gear 206 having a plurality of teeth 212, is positioned so that it is aligned over the inspection hole 114 on the top of brake caliper 104 and with a channel 340 extending about the circumference of the disc brake rotor 100. A coupler bracket 320 may be positioned over and/or attached to the caliper 104 to assist in retaining the sprocket 206 in place. The coupler bracket includes a pair of side walls 322,323 connected at the top of one end by an upper wall member 324. The side walls 322,323 define a hollow interior and are spaced apart to receive the side portions 106, 108 of the brake caliper 104 there between. Lips 326 may extend along the tops of the side walls 322,323 for placement over the tops 107, 109 of the side portions 106,108. Referring to FIG. 39, the coupler bracket 320 may be attached to the caliper 104 through a plurality of bolts or rivets (not shown) that extend through holes 330. While a plurality of holes are shown for receiving bolts or other connectors, it is appreciated that other known form of connections may be used and not depart from the scope of the present invention.

The upper wall member 324 and lips 326 define an opening 332 that substantially aligns with the inspection hole 114 of the caliper to permit part of a chain 300 or other rotational conveyor such as, but not limited to, a timing belt or pulley to extend therethrough.

At least one of the side walls 322,323 includes an opening 350 for receiving part of the shaft or axle 208 therethrough. It is appreciated that the opening may be positioned at the top of the side wall 322,323 or within to help retain the shaft 208 and sprocket 206 in place. Bushings or other friction reducing members may be used to facilitate rotation of the shaft 208 therein. While the drawings only show the shaft as extending through one of the side walls, it is appreciated that it may extend through a corresponding opening on the opposing sidewall as well.

While the bracket coupler 320 is shown as a separate component that may be attached to a caliper 104 to allow existing systems to be retrofitted with less components, it is appreciated that it may be integral with the caliper 104 and not depart from the scope of the present invention.

In operation, the chain 300 extends around a substantial portion of the circumference within the channel 340 of the disc brake rotor 100 and through the inspection hole 114 and opening 332 to wrap around part of the sprocket 206 and engage a plurality of its teeth 212 thereto. The chain 300 engages the disc brake rotor 100 through friction, a plurality of tapered ends 216 of the spokes or elongated members 214 of the disc brake rotor 100, or other known connectors 336 or connecting methods. As the disc brake rotor 100 rotates, the chain 300 rotates with it, thereby rotating the sprocket 206 and attached shaft or axle 208 to the generator 204 to create energy to be stored in the vehicle. If desired, a clutch 230 may be utilized to selectively permit control of the transmission of the energy to the generator 204. Similarly, the generation of electricity may be electronically shunted to minimize the load when not generating energy.

It is appreciated that the ratio between the size of the sprocket 206 and the disc brake 100 or other rotational component connected to the wheel may vary to increase or optimize energy generation depending upon the expected average speed for the vehicle. In particular, for vehicles that travel primarily in cities or towns and thus have a lower average speed (e.g., 15 mph to 35 mph), a lower ratio (e.g., 1:25) is desired to increase energy generation. For vehicles that travel more on highways or over longer distances, a higher ratio (e.g., 1:9) may be employed to increase energy generation. The adjustment is driven by the optimal performance requirements of the generator. Generators such as alternators have an ideal range or rpm (rate per minute) where they perform at their best. By adjusting the ratio and depending on the type of vehicle usage (low or high speed), the amount of energy that is generated may be increased or optimized.

The installation of the above energy generation systems, whether as standalone addition, with or without electronic links to the vehicle control inputs, or as an integrated factory part replacement (either FIG. 1 or FIG. 38, for examples) that would plug into the vehicle computer, would accomplish the generation of energy from an existing vehicle design. It is further appreciated that when multiple energy generation systems are utilized in a single vehicle, they may operate together or independently of one another (e.g., connected to the same or separate energy storage units or batteries).

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any disclosed embodiments are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A system for the generation of energy in a vehicle having a disc brake, the system comprising:
    a disc brake rotor having a circumference;
    an energy transformation component;
    a rotational coupler connected to the energy transformation component; and
    a rotational conveyor extending partially around the disc brake rotor and engaging the circumference of the disc brake rotor and part of the rotational coupler.

2. The system of claim 1 wherein the energy transformation component is a generator.

3. The system of claim 2 wherein the generator is an alternator.

4. The system of claim 1 wherein the rotational coupler has a plurality of teeth.

5. The system of claim 4 wherein the rotational coupler is a sprocket.

6. The system of claim 5 wherein the rotational conveyor is a chain.

7. The system of claim 5 wherein the disc brake rotor further comprises a plurality of connectors for removably engaging the chain.

8. The system of claim 1 wherein the rotational conveyor is a timing belt.

9. The system of claim 1 further comprising a shaft connecting the rotational coupler to the energy transformation component.

10. The system of claim 1 which further comprises a clutch, the clutch selectively controlling the generation of energy by the energy transformation component.

11. A system for the generation of energy in a vehicle having a disc brake and a disc brake caliper having an inspection hole in its top, the system comprising:
    a disc brake rotor having a circumference;
    a generator;
    a rotational coupler positioned above the inspection hole of the disc brake caliper and aligned with the circumference of the disc brake rotor;

a shaft connecting the rotational coupler and the generator; and a rotational conveyor extending through the inspection hole and partially around and engaging both the disc brake rotor about the circumference and the rotational coupler.

12. The system of claim 11 which further comprises a coupler bracket connected to the disc brake caliper and having at least one hole for rotationally receiving part of the shaft.

13. The system of claim 11 wherein the rotational coupler has a plurality of teeth.

14. The system of claim 11 wherein the rotational coupler is a sprocket.

15. The system of claim 11 wherein the rotational conveyor is a chain.

16. The system of claim 15 wherein the disc brake rotor further comprises a plurality of connectors for removably engaging the chain.

17. The system of claim 11 wherein the rotational conveyor is a timing belt.

18. The system of claim 11 which further comprises a clutch, the clutch selectively controlling the generation of energy by the generator.

19. A system for the generation of energy in a vehicle having a disc brake and a disc brake caliper having an inspection hole in its top, the system comprising:

a disc brake rotor having a central circumference, the disc brake rotor comprises a plurality of connectors positioned about the circumference;

a generator;

a rotational coupler positioned above the inspection hole of the disc brake caliper and aligned with the circumference of the disc brake rotor, the rotational coupler having a plurality of teeth;

a shaft connecting the rotational coupler and the generator; and a chain extending partially around both the circumference of the disc brake rotor the rotational coupler, the chain engaging some of the plurality of connectors of the disc brake rotor and some of the plurality of teeth of the rotational connector; and a coupler bracket connected to the disc brake caliper and having at least one hole for rotationally receiving part of the shaft.

\* \* \* \* \*